United States Patent
Huang et al.

(10) Patent No.: US 12,249,910 B1
(45) Date of Patent: Mar. 11, 2025

(54) SWITCHING POWER CONVERTER AND ACTIVE EMI FILTER CIRCUIT THEREOF

(71) Applicant: Richtek Technology Corporation, Zhubei (TW)

(72) Inventors: Chen-Pin Huang, Taoyuan (TW); Chia-Chun Li, Yunlin (TW); Chen-Lin Hsu, Taoyuan (TW); Hung-Yu Cheng, Taipei (TW); Wan-Hsuan Yang, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 0 days.

(21) Appl. No.: 18/736,856

(22) Filed: Jun. 7, 2024

Related U.S. Application Data

(62) Division of application No. 17/851,015, filed on Jun. 27, 2022, now Pat. No. 12,034,367.

(60) Provisional application No. 63/215,591, filed on Jun. 28, 2021.

(51) Int. Cl.
  *H02M 3/158* (2006.01)
  *H02M 1/00* (2006.01)
  *H02M 1/34* (2007.01)
  *H02M 1/44* (2007.01)

(52) U.S. Cl.
  CPC .......... *H02M 1/44* (2013.01); *H02M 1/0009* (2021.05); *H02M 1/34* (2013.01); *H02M 3/158* (2013.01)

(58) Field of Classification Search
  CPC .......... H02M 1/44; H02M 1/34; H02M 1/348; H02M 1/344; H02M 1/0009
  See application file for complete search history.

(56) References Cited

U.S. PATENT DOCUMENTS

| | | | | |
|---|---|---|---|---|
| 3,946,285 A * | 3/1976 | Beery | ..................... | H03K 17/64 361/153 |
| 4,929,882 A * | 5/1990 | Szepesi | ................. | H02M 3/156 323/222 |
| 5,602,464 A * | 2/1997 | Linkowsky | ............... | G05F 3/22 323/224 |
| 5,687,070 A * | 11/1997 | Jacobs | ................ | H02M 1/4225 363/126 |
| 5,905,407 A * | 5/1999 | Midya | ................... | H03F 1/0222 330/10 |
| 5,949,275 A * | 9/1999 | Moller | ................ | H02M 3/1563 327/536 |
| 6,127,814 A * | 10/2000 | Goder | ................ | H02M 3/1588 323/282 |
| 7,279,873 B2 * | 10/2007 | Lin | ......................... | H02M 1/32 323/284 |

(Continued)

*Primary Examiner* — Yusef A Ahmed

(74) *Attorney, Agent, or Firm* — Tung & Associates

(57) ABSTRACT

A switching power converter includes: a power stage circuit, including at least one transistor which is configured to operably switch an inductor to convert an input power to an output power; and an active EMI filter circuit, including at least one amplifier, wherein the at least one amplifier is configured to operably sense a noise input signal which is related to a switching noise caused by the switching of the power stage circuit, and amplify the noise input signal to generate a noise cancelling signal, wherein the noise cancelling signal is injected into an input node of the switching power converter, so as to suppress the switching noise and thus reducing EMI, wherein the input power is provided through the input node to the power stage circuit.

2 Claims, 16 Drawing Sheets

(56) References Cited

U.S. PATENT DOCUMENTS

| | | | | |
|---|---|---|---|---|
| 7,589,514 B1* | 9/2009 | Fernald | ............... | H02M 1/38 |
| | | | | 324/522 |
| 2006/0038546 A1* | 2/2006 | Lin | ............... | H02M 1/32 |
| | | | | 323/284 |
| 2010/0301827 A1* | 12/2010 | Chen | ............... | H02M 3/156 |
| | | | | 323/299 |
| 2011/0133787 A1* | 6/2011 | Ball | ............... | H02M 3/1588 |
| | | | | 327/103 |
| 2011/0175584 A1* | 7/2011 | Huber | ............... | H02M 3/158 |
| | | | | 323/282 |
| 2012/0206116 A1* | 8/2012 | Fricker | ............... | H02M 3/158 |
| | | | | 323/271 |
| 2013/0015830 A1* | 1/2013 | Zhang | ............... | H02M 3/1588 |
| | | | | 323/282 |
| 2014/0071719 A1* | 3/2014 | Stahl | ............... | H02M 1/15 |
| | | | | 363/44 |
| 2014/0292401 A1* | 10/2014 | Shen | ............... | H02M 1/44 |
| | | | | 327/552 |
| 2016/0164412 A1* | 6/2016 | Li | ............... | G01R 31/40 |
| | | | | 323/299 |
| 2016/0190922 A1* | 6/2016 | Malinin | ............... | H02M 3/156 |
| | | | | 323/271 |
| 2017/0187301 A1* | 6/2017 | Shiau | ............... | G06F 1/26 |
| 2019/0146020 A1* | 5/2019 | Banerji | ............... | G01R 31/013 |
| | | | | 323/282 |
| 2020/0413575 A1* | 12/2020 | Chu | ............... | H02M 1/44 |
| 2021/0100082 A1* | 4/2021 | Aoki | ............... | H05B 45/38 |
| 2023/0098806 A1* | 3/2023 | Xia | ............... | H03G 5/22 |
| | | | | 330/251 |
| 2023/0268836 A1* | 8/2023 | Yu | ............... | H02M 1/0009 |
| | | | | 323/259 |
| 2023/0275502 A1* | 8/2023 | Guedon | ............... | H02M 1/0009 |
| | | | | 324/123 R |

* cited by examiner

Condition: Vin=12V, Vout=5.2V/Iout=3A, Fsw=2.1MHz

| dB \ types harmonics | w/o AEF | AEF Fig. 2 | AEF Fig. 4 | AEF Fig. 6 | AEF Fig. 8 | AEF Fig. 10 | AEF Fig. 12 |
|---|---|---|---|---|---|---|---|
| Base band | -33.08 | -59.3 | -61.3 | -60.5 | -60 | -60.6 | -61.5 |
| 2nd harmonic | -63.12 | -89.7 | -89.6 | -81.9 | -88.8 | -86.4 | -89.9 |
| 3rd harmonic | -58 | -84 | -84.2 | -84 | -82.5 | -82.3 | -83.7 |

Fig. 15

SWITCHING POWER CONVERTER AND ACTIVE EMI FILTER CIRCUIT THEREOF

CROSS REFERENCE

The present invention claims priority to following provisional applications, Ser. No. 63/215,591, filed on Jun. 28, 2021.

This is a divisional application of U.S. application Ser. No. 17/851,015, filed on Jun. 27, 2022.

BACKGROUND OF THE INVENTION

Field of Invention

The present invention relates to a switching power converter; particularly, it relates to a switching power converter utilizing AEF (active EMI filter) circuit. The present invention also relates to an active EMI filter circuit which is configured to prevent EMI (electro-magnetic interference) caused by switching activities in the power stage of the switching power converter.

Description of Related Art

Related prior art utilizing different approaches from the present invention for canceling switching noise includes: R. Goswami, S. Wang and Y. Chu, "Design of an active differential mode current filter for a boost power factor correction AC-DC converter," 2015 IEEE Energy Conversion Congress and Exposition (ECCE), Montreal, Q C, 2015, pp. 4375-4382.

More and more electrical devices are utilized in modern vehicles. The EMI issue in switching power converters becomes more and more challenging, especially in high current applications. In order to reduce EMI noise to meet international standard such as CISPR 25, a passive EMI filter 80, consisting of a filtering inductor Lf, a filtering capacitor Cf, and a RC damping circuit (Cd and Rd), is commonly implemented for mitigating EMI in prior art switching power converter 101 (FIG. 1). However, the passive EMI filter 80 need a large inductor and capacitor for sufficient noise filtering efficacy, which causes large size and higher cost.

Switching power converters having various active EMI filter circuits for mitigating EMI are proposed in the present invention. Compared to the prior art, size and cost are greatly reduced by the utilization of the active EMI filter circuit in the switching power converter according to the present invention.

SUMMARY OF THE INVENTION

From one perspective, the present invention provides a switching power converter comprising: a power stage circuit, including at least one transistor, configured to operably switch an inductor to convert an input power to an output power; a switching controller, configured to operably control the at least one switch; and an AEF (Active EMI Filter) circuit, including at least one amplifier, wherein the at least one amplifier is configured to operably sense a noise input signal which is related to a switching noise caused by the switching of the power stage circuit, and amplify the noise input signal to generate a noise cancelling signal, wherein the noise cancelling signal is injected into an input node of the switching power converter, so as to suppress the switching noise and thus reducing EMI, wherein the input power is provided through the input node to the power stage circuit.

In one preferred embodiment, the switching power converter further comprises a sensing resistor, wherein a first terminal of the sensing resistor is coupled to the input node, and a second terminal of the sensing resistor is coupled to the power stage circuit, wherein the noise input signal is generated according to a voltage across the sensing resistor.

In one preferred embodiment, the at least one amplifier includes an amplifier, wherein an inverting input terminal of the amplifier is coupled to the second terminal of the sensing resistor through a first input capacitor, and a non-inverting input terminal of the amplifier is coupled to the first terminal of the sensing resistor through a second input capacitor, such that an AC (alternating current) component of the noise input signal are differentially coupled from the sensing resistor; wherein the noise cancelling signal is generated from an output terminal of the amplifier, wherein the noise cancelling signal is coupled to the first terminal of the sensing resistor through an injection capacitor, such that an AC component of the noise cancelling signal is injected into the input node of the switching power converter.

In one preferred embodiment, the AEF circuit further includes a first input resistor and a second input resistor which are coupled in series with the first input capacitor and the second input capacitor respectively.

In one preferred embodiment, the at least one amplifier includes a first amplifier and a second amplifier, wherein an inverting input terminal of the first amplifier is coupled to the first terminal of the sensing resistor through a first input capacitor, and a non-inverting input terminal of the first amplifier is coupled to the second terminal of the sensing resistor through a second input capacitor, such that an AC (alternating current) component of the noise input signal is differentially coupled from the sensing resistor; wherein an inverting input terminal of the second amplifier is coupled to the output terminal of the first amplifier through a DC blocking capacitor, wherein the noise cancelling signal is generated from an output terminal of the second amplifier, wherein the noise cancelling signal is coupled to the first terminal of the sensing resistor through an injection capacitor, such that an AC component of the noise cancelling signal is injected into the input node of the switching power converter.

In one preferred embodiment, the inverting input terminal of the first amplifier is coupled to the first terminal of the sensing resistor further through a first input resistor which is coupled to the first input capacitor in parallel, and the non-inverting input terminal of the first amplifier is coupled to the second terminal of the sensing resistor further through a second input resistor which is coupled to the second input capacitor in parallel, such that an AC (alternating current) component of and a DC (direct current) component of the noise input signal are differentially coupled from the sensing resistor.

In one preferred embodiment, an AC coupling ratio is higher than a DC coupling ratio for coupling the noise input signal to the inverting terminal and the non-inverting terminal of the first amplifier.

In one preferred embodiment, the switching power converter further comprises a passive filter circuit, wherein the passive filter circuit is coupled between the sensing resistor and the power stage circuit, wherein the passive filter circuit includes a filtering inductor and a filtering capacitor for further filtering the noise input signal.

In one preferred embodiment, the switching power converter further comprises a passive filter circuit, wherein the passive filter circuit is coupled between the input node and the power stage circuit, wherein the passive filter circuit includes a filtering inductor and a filtering capacitor for further filtering the noise input signal.

In one preferred embodiment, the switching power converter further comprises a snubber circuit, wherein the snubber circuit includes a snubber capacitor and a snubber resistor which are coupled in series from a switching node, wherein the switching node is coupled to one terminal of the inductor; wherein the at least one amplifier includes an amplifier which is configured as a non-inverting amplifier stage, wherein a non-inverting input terminal of the amplifier is coupled to the switching node through the snubber circuit and an input capacitor which is coupled to a joint node where the snubber capacitor and the snubber resistor is connected, and an inverting input terminal of the amplifier is coupled to a ground node through a DC blocking capacitor, such that an AC component of the noise input signal is coupled from the sensing resistor; wherein the noise cancelling signal is generated from an output terminal of the amplifier and is injected into the input node of the switching power converter through an injection capacitor.

In one preferred embodiment, the at least one transistor includes a high side transistor and/or a low side transistor which are coupled to the switching node for switching one terminal of the inductor; wherein the noise input signal is related to a drain-source current of the high side transistor and/or a drain-source current of the low side transistor.

In one preferred embodiment, the switching power converter of claim is configured as at least one of the following: a, wherein the at least one amplifier includes a first amplifier which is configured as a non-inverting amplifier stage, wherein a non-inverting input terminal of the first amplifier is coupled to a first sensing device for sensing the drain-source current of the high-side transistor through a first input capacitor such that an AC component of the noise input signal is coupled from the first sensing device, and an inverting input terminal of the first amplifier is coupled to a ground node through a first DC blocking capacitor; and/or b, wherein the at least one amplifier includes a second amplifier which is configured as an inverting amplifier stage, wherein an inverting input terminal of the second amplifier is coupled to a second sensing device for sensing the drain-source current of the low-side transistor through a second input capacitor such that an AC component of the noise input signal is coupled from the second sensing device, and a non-inverting input terminal of the second amplifier is coupled to a DC voltage; wherein the noise cancelling signal is generated according to the first amplifier and/or the second amplifier and is injected into the input node of the switching power converter.

In one preferred embodiment, a first output signal generated by the first amplifier and a second output signal generated by the second amplifier are superposed to generate the noise cancelling signal.

In one preferred embodiment, the at least one amplifier further includes a third amplifier which is configured as a non-inverting adder circuit, wherein a non-inverting input terminal of the third amplifier is coupled to an output terminal of the first amplifier through a second DC blocking capacitor and is coupled to an output terminal of the second amplifier through a third DC blocking capacitor such that an AC component of the first output signal and an AC component of the second output signal are superposed; wherein the noise cancelling signal is generated from an output terminal of the third amplifier and is injected into the input node of the switching power converter through an injection capacitor.

From another perspective, the present invention provides an active EMI filter circuit for use in a switching power converter, wherein the switching power converter includes: at least one transistor, configured to operably switch an inductor to convert an input power to an output power, the active EMI filter circuit comprising: at least one amplifier; and plural passive filtering devices, coupled to the at least one amplifier; wherein the at least one amplifier is configured to operably sense a noise input signal which is related to a switching noise caused by the switching of the power stage circuit, and amplify the noise input signal to generate a noise cancelling signal, wherein the noise cancelling signal is injected into an input node of the switching power converter, so as to suppress the switching noise and thus reducing EMI, wherein the input power is provided through the input node to the power stage circuit.

The objectives, technical details, features, and effects of the present invention will be better understood with regard to the detailed description of the embodiments below, with reference to the attached drawings.

BRIEF DESCRIPTION OF THE DRAWINGS

FIG. 15 shows a comparison table of the noise level of the prior art and of all the aforementioned embodiments of the switching power converters having various AEF circuits according to the present invention.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2:
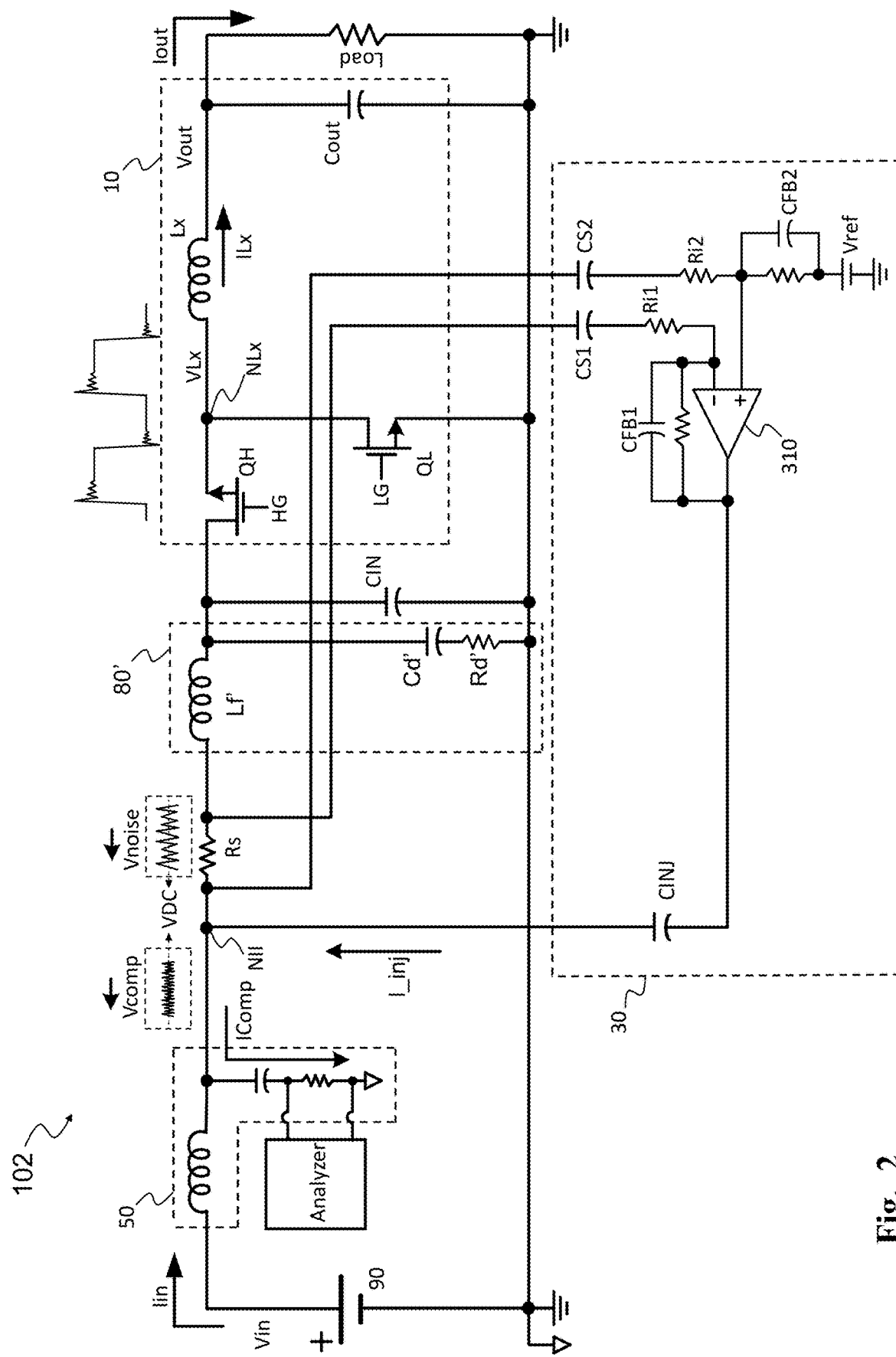
FIG. 2 shows a schematic diagram of a preferred embodiment of the switching power converter of the present invention.

FIG. 2 shows a schematic diagram of a preferred embodiment of the switching power converter of the present invention. The switching power converter 102 comprises a power stage circuit 10 and an AEF circuit 30. The power stage circuit 10 includes at least one transistor which is configured to operably switch an inductor L to convert an input power to an output power. The AEF (Active EMI Filter) circuit 30 is configured to sense a noise input signal Vnoise which is related to a switching noise caused by the switching of the power stage circuit 10 (for example when switching the switch QH or QL), and amplify the noise input signal Vnoise to generate a noise cancelling signal I_inj. In one embodiment, the noise cancelling signal I_inj is injected into an input node NII of the switching power converter 102, so as to suppress the switching noise and thus reducing EMI. In this embodiment, the input power is provided through the input node to the power stage circuit.

In one embodiment, the input power for example can be provided by a battery 90. The input power includes input voltage Vin and input current Iin. In one embodiment, the output power includes output voltage Vout and provides an output current Iout to a load.

In one embodiment, the power stage 10 includes a high side switch QH and a low side switch QL which are configured to switch the inductor Lx by control signals HG and LG. In this embodiment, the power stage 10 is a buck converter. However, the present invention can also be applied in other types of switching converters such as boost, buck-boost, flyback converters, and etc.

Note that a line impedance stabilization network (LISN) 50 is coupled between the input power and an input node NII where the input power is provided through to the power stage 10. The LISN and the analyzer are utilized for measuring the level of the switching noise caused by the power stage circuit 10 and the EMI suppression efficacy achieved by the AEF circuit 30. Note that the LISN can be removed and the input power can be directly connected to the input node NII during actual applications in one embodiment.

More specifically, in one embodiment, the AEF circuit 30 includes at least one amplifier, wherein the at least one amplifier is configured to operably sense the noise input signal Vnoise and amplify the noise input signal Vnoise to generate the noise cancelling signal I_inj.

Still referring to FIG. 2, in this embodiment, the switching power converter 102 further comprises a sensing resistor Rs. A first terminal of the sensing resistor Rs is coupled to the input node NII, and a second terminal of the sensing resistor is coupled to the power stage circuit 10. The noise input signal Vnoise is generated according to a voltage across the sensing resistor Rs.

Still referring to FIG. 2, in one embodiment, the AEF circuit 30 includes an amplifier 310, which is configured as a differential amplifier stage collaborating the passive components shown in FIG. 2. More specifically, an inverting input terminal of the amplifier 310 is coupled to the second terminal of the sensing resistor Rs through an input capacitor CS1, and a non-inverting input terminal of the amplifier 310 is coupled to the first terminal of the sensing resistor Rs through an input capacitor CS2, such that an AC (alternating current) component of the noise input signal Vnoise are differentially coupled from the sensing resistor Rs. In one embodiment, the AEF circuit 30 further includes an input resistor Ri1 and an input resistor Ri2 which are coupled in series with the input capacitor CS1 and the input capacitor CS2 respectively.

Still referring to FIG. 2, in one embodiment, the noise cancelling signal I_inj is generated from an output terminal of the amplifier 310. In one embodiment, the noise cancelling signal I_inj is coupled to the first terminal of the sensing resistor Rs through an injection capacitor CINJ, such that an AC component of the noise cancelling signal I_inj is injected into the input node NII of the switching power converter 102. In one embodiment, the at least one amplifier is arranged to make the phase of the noise cancelling signal I_inj is inverse to the phase of the noise input signal Vnoise.

Note that, in this embodiment, the DC component of the noise input signal Vnoise is blocked by the input capacitors CS1 and CS2 and the DC component of the output signal of the amplifier 310 is blocked by the injection capacitor CINJ. In one embodiment, a feedback capacitor CFB1 and a feedback resistor are coupled in parallel between the output terminal and the inverting terminal for feedback configuration, and a feedback capacitor CFB2 and a feedback resistor are coupled in parallel from the non-inverting terminal to a DC reference voltage Vref.

Figure 1:
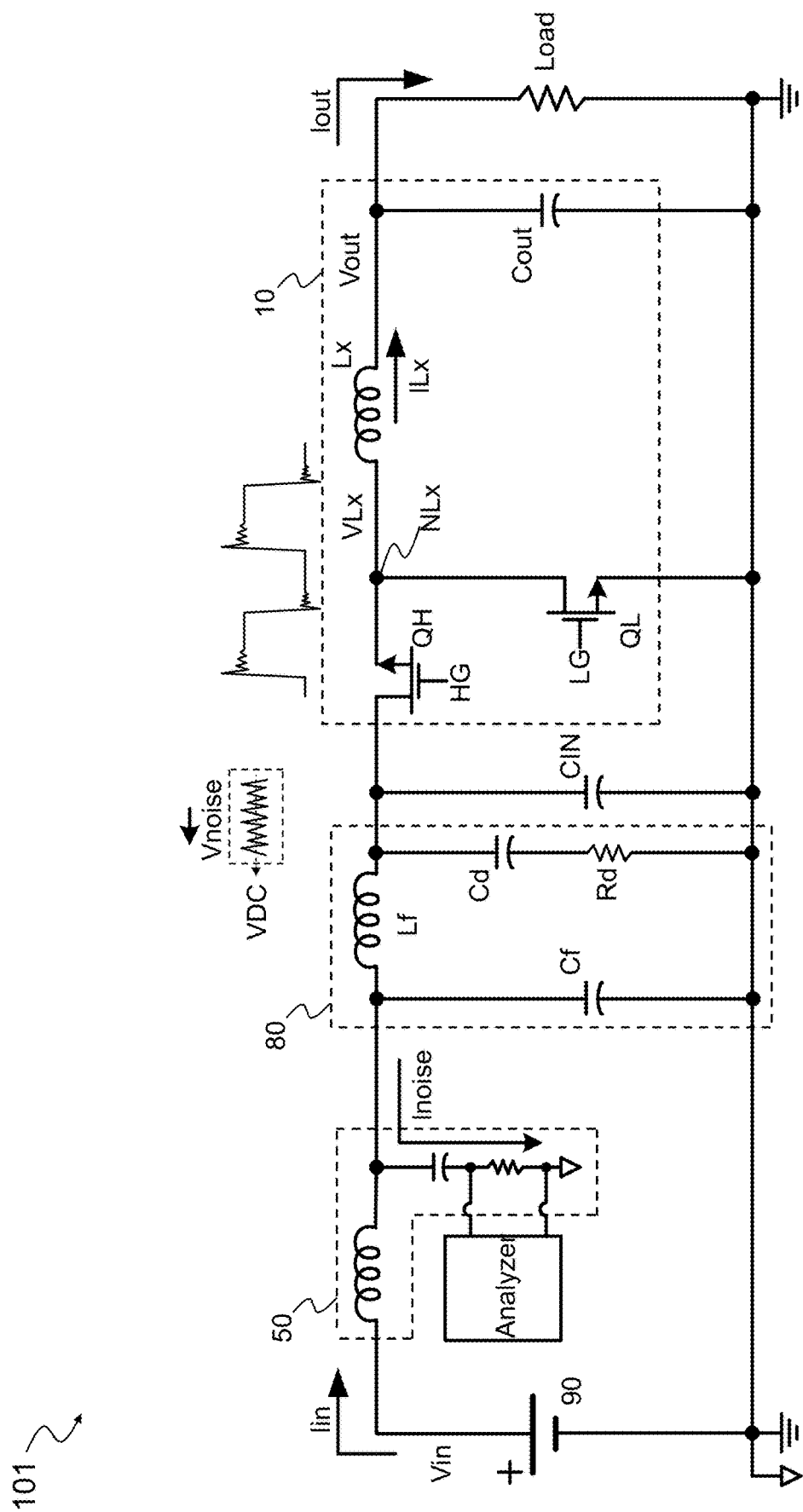
FIG. 1 shows a schematic diagram of a prior art switching power converter.
Figure 3:
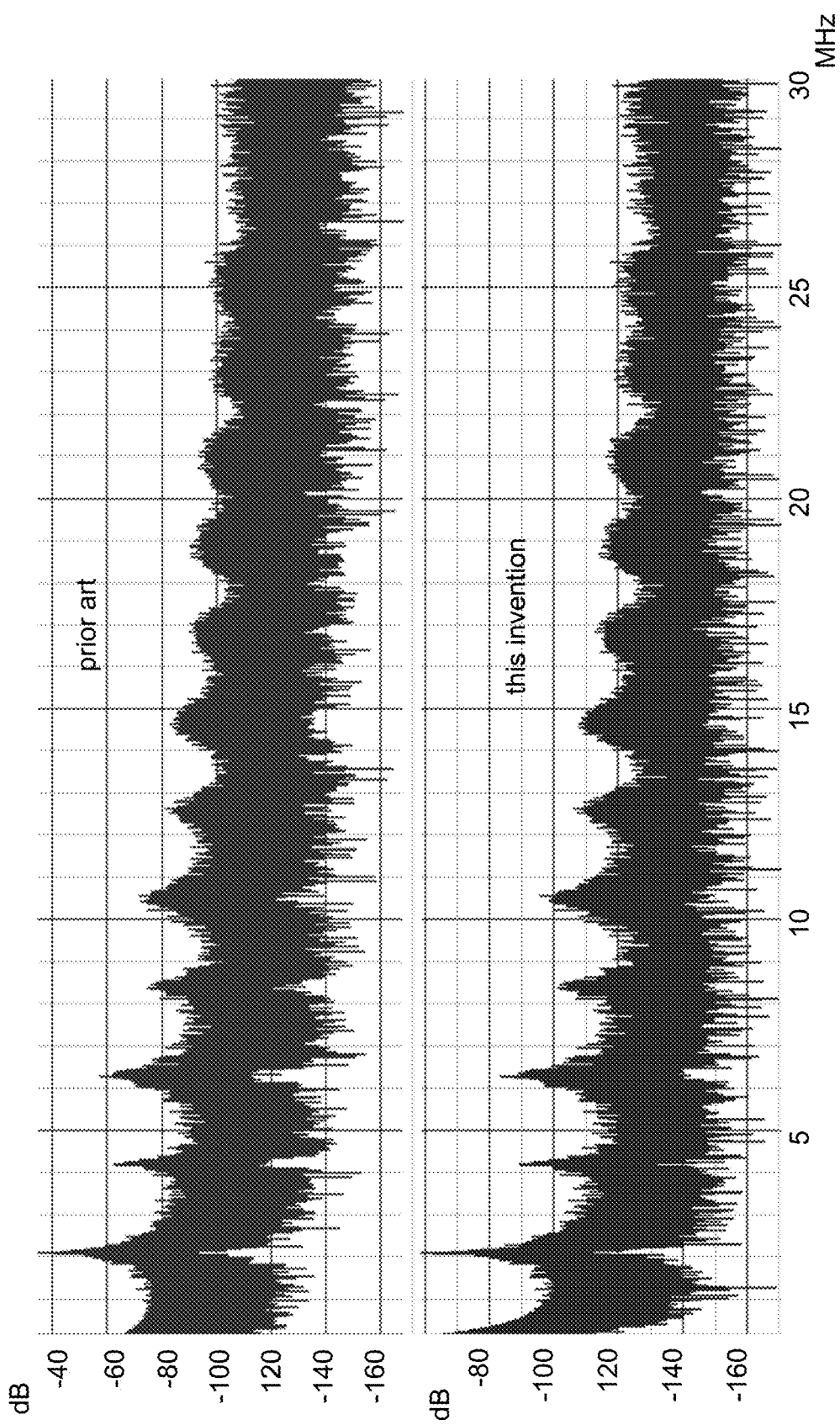
FIG. 3 shows frequency response diagrams of FFT measured by the analyzer coupled from the LISN.

FIG. 3 shows frequency response diagrams of FFT (Fast Fourier Transform) measured by the analyzer coupled from the LISN 50 of the prior art as shown in FIG. 1 and of the switching power converter 102. Note that from the baseband to all the higher harmonics show improvements in the switching power converter 102 which includes the AEF circuit for suppressing the switching noise.

Figure 4:
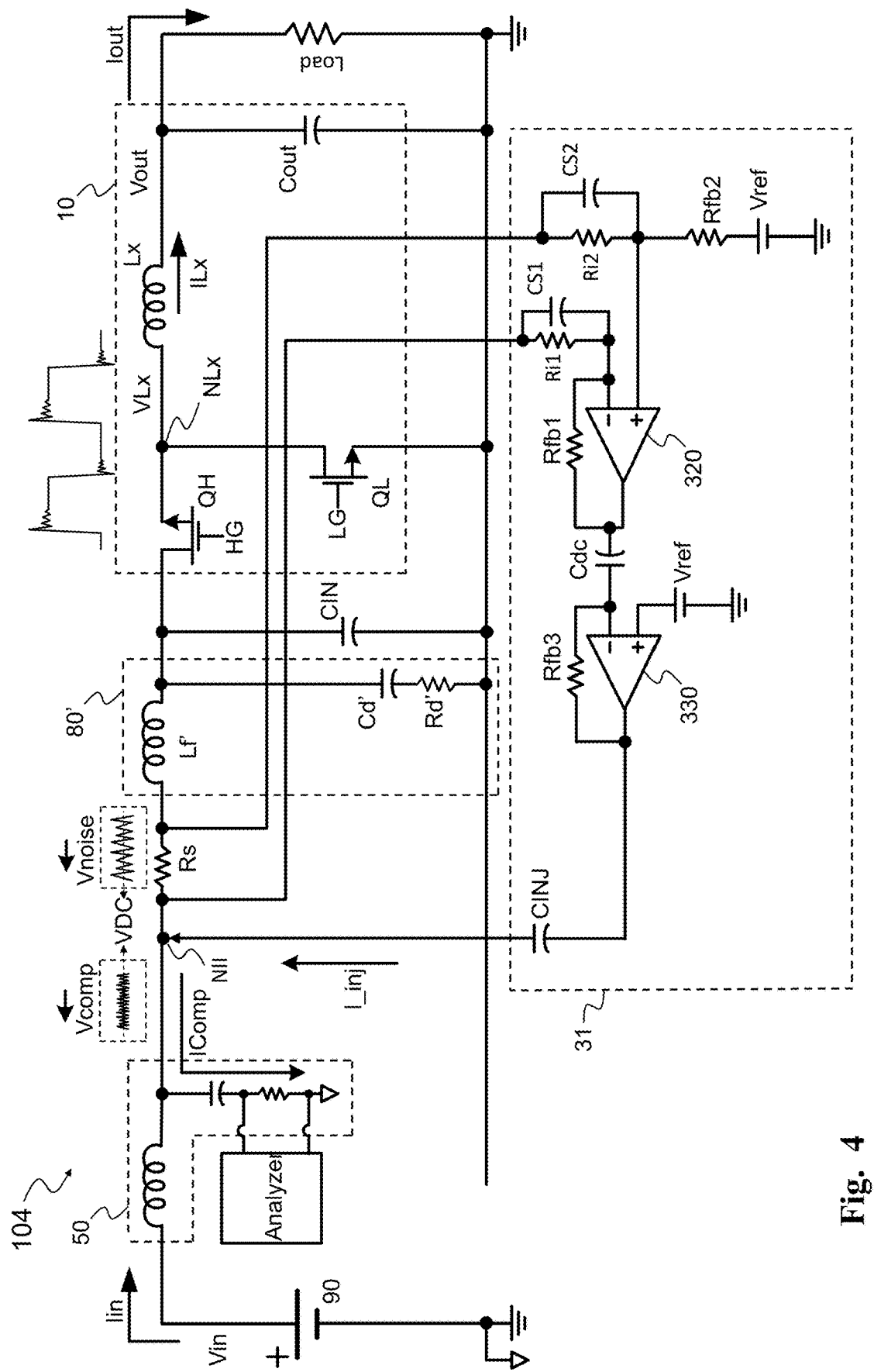
FIG. 4 shows a schematic diagram of a preferred embodiment of the switching power converter of the present invention.

FIG. 4 shows a schematic diagram of a preferred embodiment of the switching power converter of the present invention. The switching power converter 104 in FIG. 4 is similar to the power converter 102 in FIG. 2. In this embodiment, the switching power converter 102 includes amplifiers 320 and 330. The amplifier 320 is configured as a differential amplifier stage. An inverting input terminal of the amplifier 320 is coupled to the first terminal of the sensing resistor Rs through an input resistor Ri1 and an input capacitor CS1 which are coupled in parallel, and a non-inverting input terminal of the amplifier 320 is coupled to the second terminal of the sensing resistor Rs through an input resistor Ri2 and an input capacitor CS2 which are coupled in parallel, such that an AC component of and a DC component of the noise input signal Vnoise are differentially coupled from the sensing resistor Rs. In one embodiment, a feedback resistor Rfb1 is coupled between the output terminal and the inverting terminal of the amplifier 320 for feedback configuration, and a feedback resistor Rfb2 is coupled from the non-inverting terminal to a DC reference voltage Vref. In one embodiment, the resistance of Rfb1 is the same as Rfb2, and the resistance of Ri1 is the same as Ri2.

From one perspective, the input capacitors CS1 and CS2 of the switching power converter 102 can be considered as feedforward capacitors, which prevents division of AC component by the resistor network. In other words, an AC coupling ratio is higher than a DC coupling ratio for coupling the noise input signal Vnoise to the inverting terminal and the non-inverting terminal of the amplifier 320.

Still referring to FIG. 4, the amplifier 330 is configured as an single-ended inverting amplifier. An inverting input terminal of the amplifier 330 is coupled to the output terminal of the amplifier 320 through the DC blocking capacitor Cdc. A non-inverting terminal of the amplifier 330 is coupled to the DC reference voltage Vref. The noise cancelling signal I_inj is generated from an output terminal of the amplifier 330. The noise cancelling signal I_inj is coupled to the first terminal of the sensing resistor Rs through an injection capacitor CINJ, such that an AC component of the noise cancelling signal I_inj is injected into the input node NII of the switching power converter 104. A feedback resistor Rfb3 is coupled between the output terminal and the inverting terminal of the amplifier 330 for feedback control. Note that, in one embodiment, the amplifiers (e.g. amplifiers 310, 320 and 330) can be single supplied amplifiers, the same hereinafter.

Still referring to FIG. 2 and FIG. 4, each of the switching power converters 102 and 104 further comprises a passive filter circuit 80'. In one embodiment, the passive filter circuit 80' is coupled between the sensing resistor Rs and the power stage circuit 10. The passive filter circuit 80' includes a filtering inductor Lf', a damping capacitor Cd' and a damping resistor Rd' for further filtering the noise input signal Vnoise. Note that due to the EMI reducing efficacy provided by the AEF circuit, the inductance of the filtering inductor Lf' and the capacitance of the damping capacitor Cd' which are required in the passive filter circuit 80' can be greatly reduced compared to the prior art, and the filtering capacitor shown in FIG. 1 can be omitted and the cost can be saved according to the present invention. Also note that an input capacitor CIN can be arranged to be coupled to the joint node between the passive filter circuit 80' and the power stage circuit 10.

Figure 5:
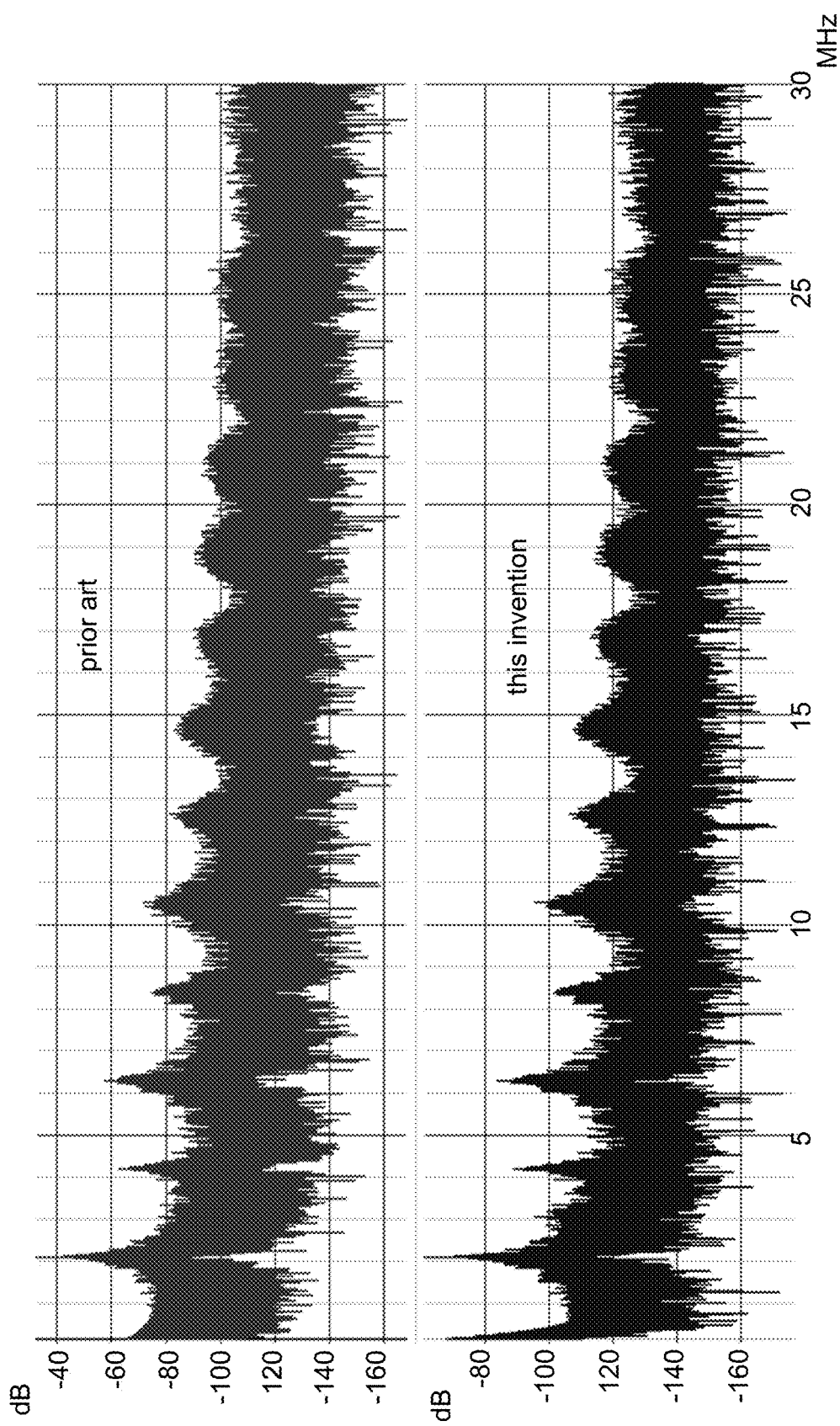
FIG. 5 shows frequency response diagrams of FFT measured by the analyzer coupled from the LISN.

FIG. 5 shows frequency response diagrams of FFT (Fast Fourier Transform) measured by the analyzer coupled from the LISN 50 of the prior art as shown in FIG. 1 and of the switching power converter 104. Note that from the baseband to all the higher harmonics show improvements in the switching power converter 104 which includes the AEF circuit for suppressing the switching noise.

Figure 6:
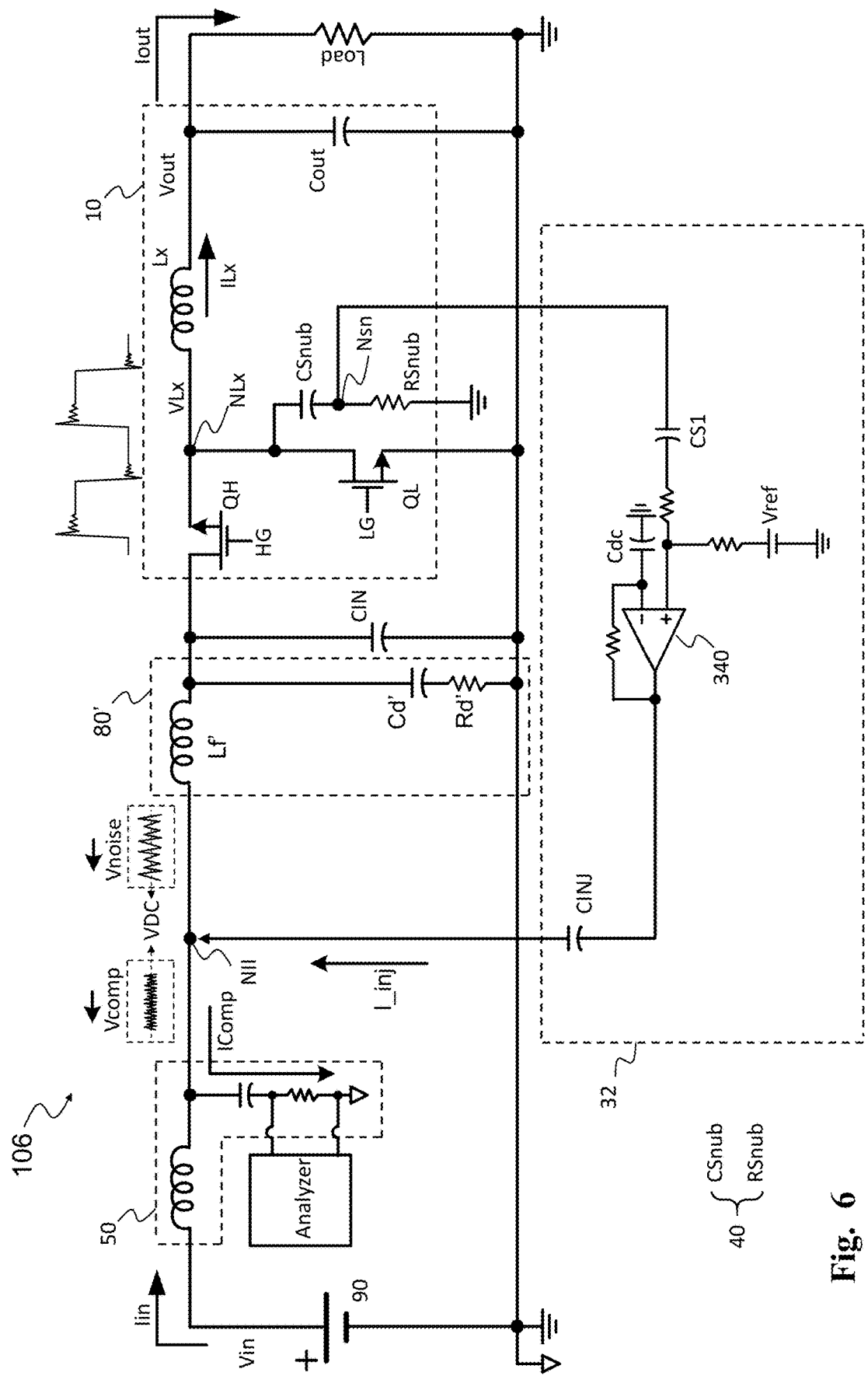
FIG. 6 shows a schematic diagram of a preferred embodiment of the switching power converter of the present invention.

FIG. 6 shows a schematic diagram of a preferred embodiment of the switching power converter of the present invention. In one embodiment, noise input signal Vnoise is related to a switching node NLx of the power stage.

The switching power converter 106 further comprises a snubber circuit 40. The snubber circuit 40 includes a snubber capacitor Csnub and a snubber resistor Rsnub which are coupled in series from the switching node NLx. The switching node NLx is coupled to one terminal of the inductor L.

In this embodiment, the amplifier 340 of the AEF circuit 32 is configured as a non-inverting amplifier stage. A non-inverting input terminal of the amplifier 340 is coupled to the switching node NLx through the snubber circuit 40. An input capacitor CS1 is coupled to a joint node Nsn where the snubber capacitor Csn and the snubber resistor Rsn is connected. The noise cancelling signal I_inj is generated from an output terminal of the amplifier 340. The noise cancelling signal I_inj is coupled to the input node NII through an injection capacitor CINJ. More specifically, an AC component of the noise cancelling signal I_inj is injected into the input node NII of the switching power converter 106.

Still referring to FIG. 6, the switching power converter 106 further comprises a passive filter circuit 80'. In one embodiment, the passive filter circuit 80' is coupled between the input node NII and the power stage circuit 10.

Figure 7:
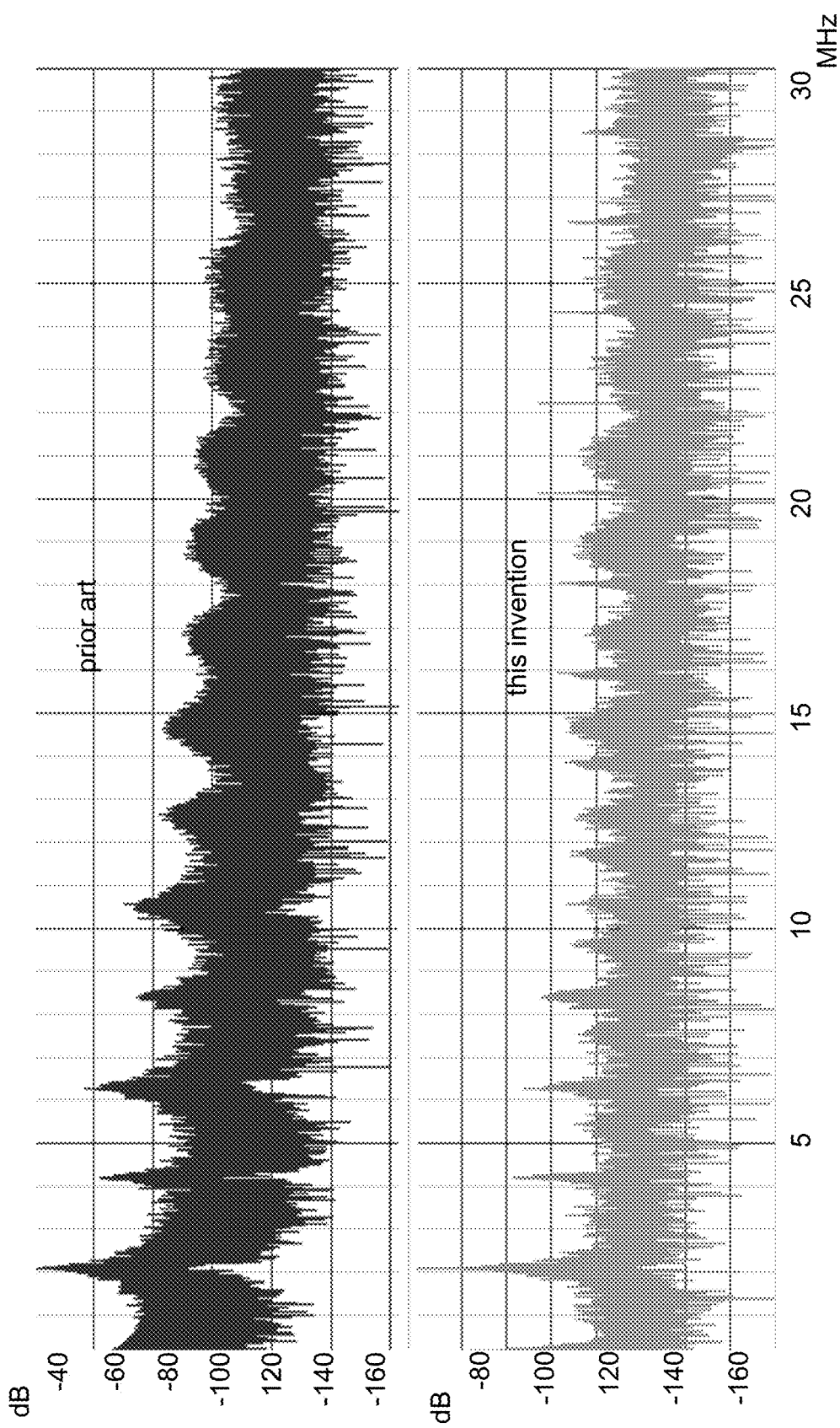
FIG. 7 shows frequency response diagrams of FFT measured by the analyzer coupled from the LISN.

FIG. 7 shows frequency response diagrams of FFT (Fast Fourier Transform) measured by the analyzer coupled from the LISN 50 of the prior art as shown in FIG. 1 and of the switching power converter 106. Note that from the baseband to all the higher harmonics show improvements in the switching power converter 106 which includes the AEF circuit for suppressing the switching noise.

Figure 8:
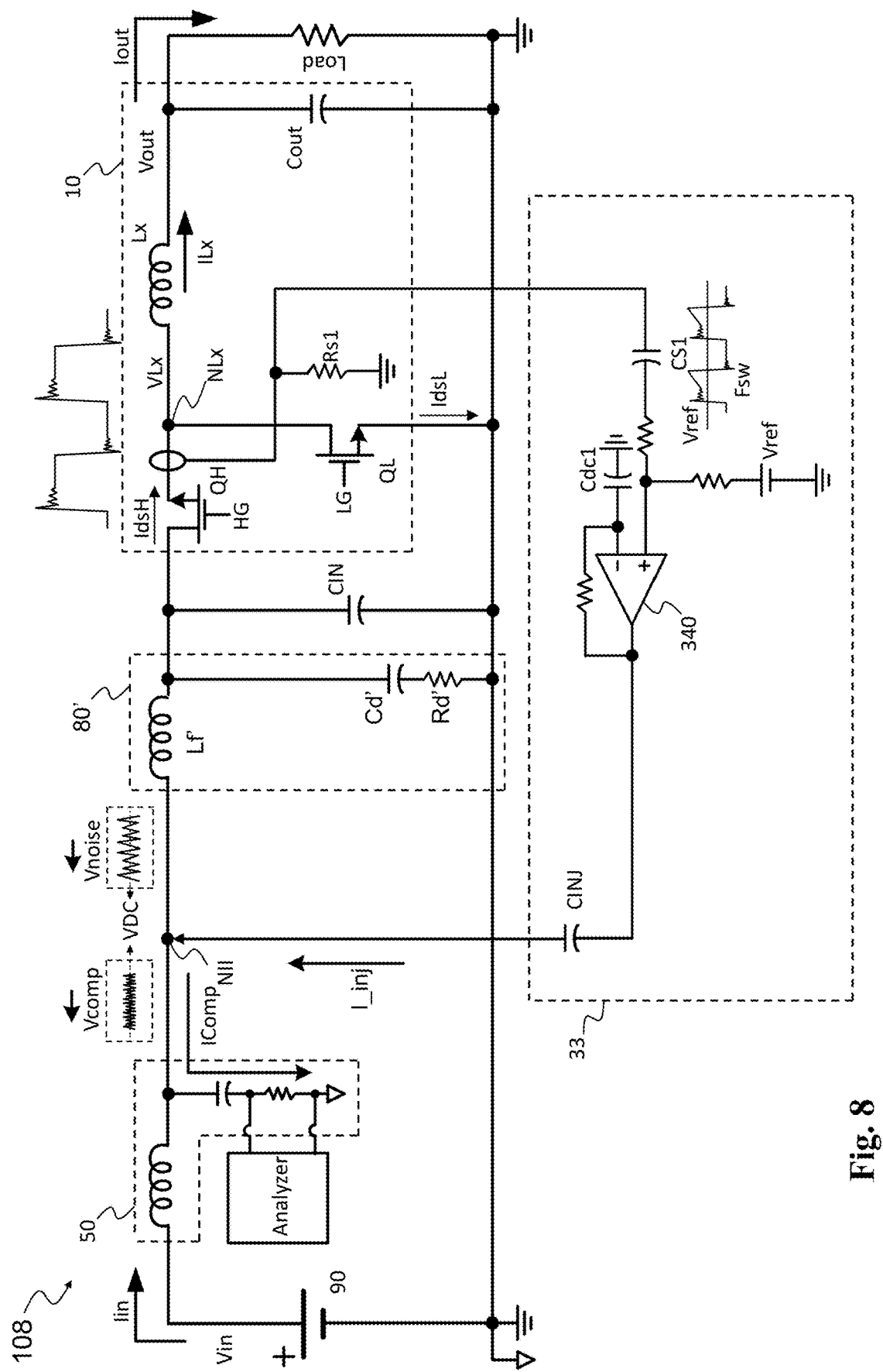
FIG. 8 shows a schematic diagram of a preferred embodiment of the switching power converter of the present invention.
Figure 10:
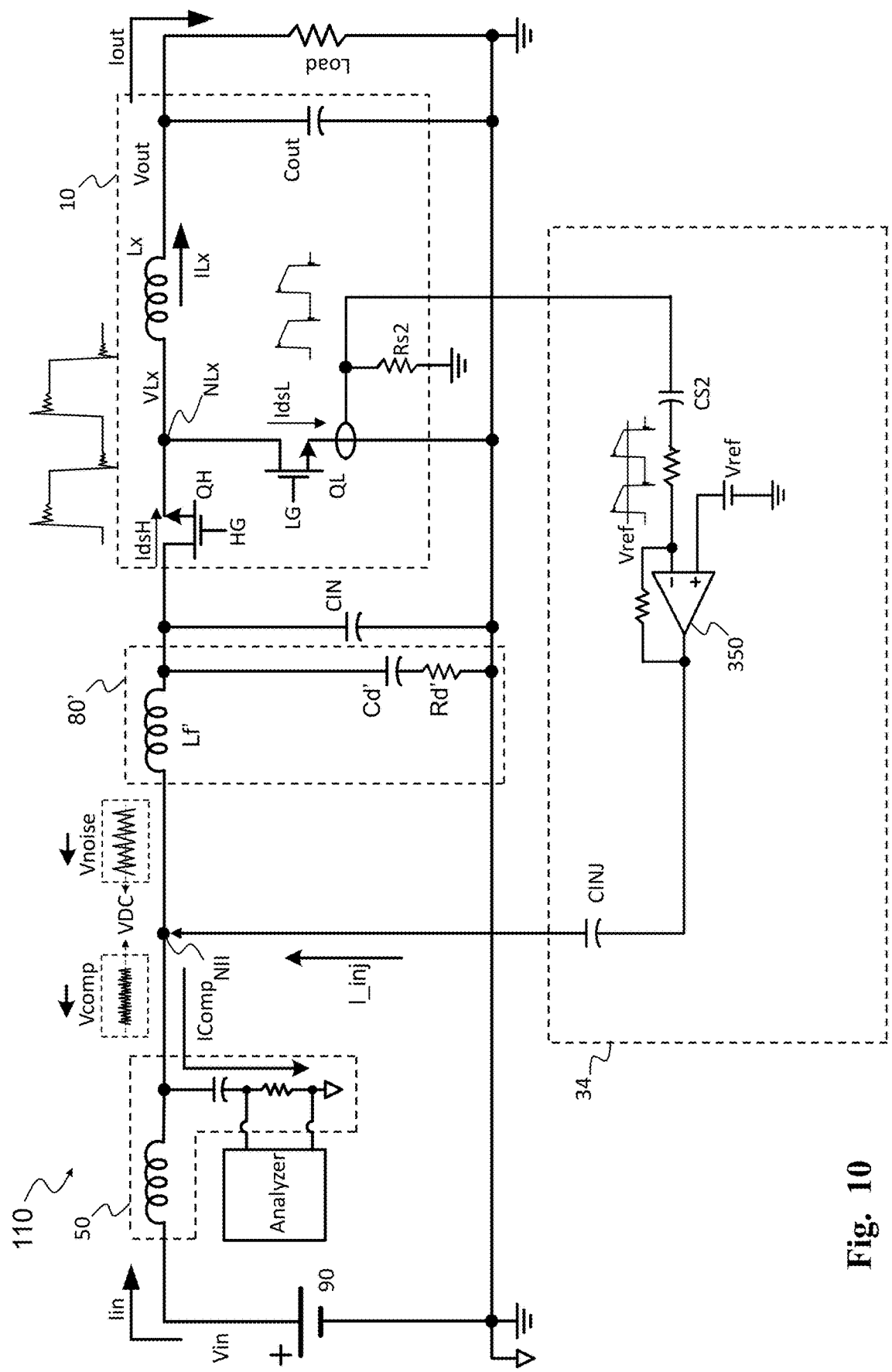
FIG. 10 shows a schematic diagram of a preferred embodiment of the switching power converter of the present invention.

FIG. 8 shows a schematic diagram of a preferred embodiment of the switching power converter of the present invention. FIG. 10 shows a schematic diagram of a preferred embodiment of the switching power converter of the present invention. FIG. 12B shows a schematic diagram of a preferred embodiment of the switching power converter of the present invention. In these embodiments, the power stage circuit 10 of each of the switching power converters 108, 110 and 112 includes a high side transistor QH and a low side transistor QL which are coupled to the switching node NLx for switching one terminal of the inductor L. In these particular embodiments, the power stage circuit 10 is configured as a buck converter. In this embodiment, the noise input signal is related to a drain-source current IdsH of the high side transistor QH, and/or a drain-source current IdsL of the low side transistor QL.

Referring to FIG. 8, the AEF circuit 33 includes an amplifier 340 which is configured as a non-inverting amplifier stage. A non-inverting input terminal of the amplifier 340 is coupled to a sensing device for sensing the drain-source current of the high side transistor QH through an input capacitor CS1 such that an AC component of the noise input signal Vnoise is coupled from the sensing device through the input capacitor CS1. In one embodiment, the sensing device can be for example a current mirror for mirroring a portion of the drain-source current IdsH and a resistor Rs1 for converting the mirrored current to a sensed voltage related to the noise input signal Vnoise. In one embodiment, the sensing device can be for example a sensing resistor coupled in series with the high side transistor QH. An inverting input terminal of the amplifier 340 is coupled to a ground node through a DC blocking capacitor Cdc1.

Still referring to FIG. 8, the noise cancelling signal I_inj is generated from an output terminal of the amplifier 340. The noise cancelling signal I_inj is coupled to the input node NII through an injection capacitor CINJ. More specifically, an AC component of the noise cancelling signal I_inj is injected into the input node NII of the switching power converter 108.

Figure 9:
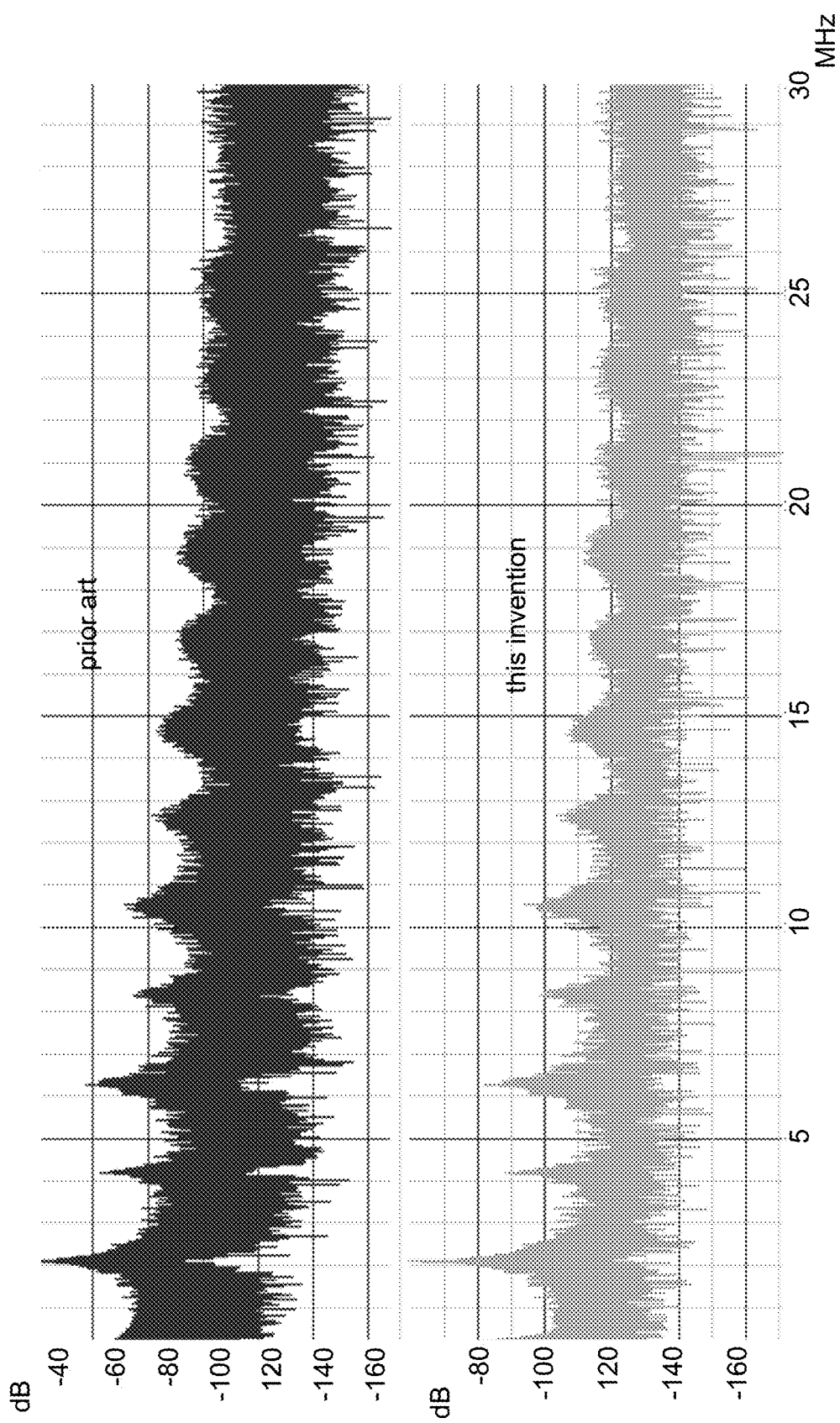
FIG. 9 shows frequency response diagrams of FFT measured by the analyzer coupled from the LISN.

FIG. 9 shows frequency response diagrams of FFT (Fast Fourier Transform) measured by the analyzer coupled from the LISN 50 of the prior art as shown in FIG. 1 and of the switching power converter 108. Note that from the baseband to all the higher harmonics show improvements in the switching power converter 108 which includes the AEF circuit for suppressing the switching noise.

Referring to FIG. 10, the AEF circuit 34 includes an amplifier 350 which is configured as an inverting amplifier stage. An inverting input terminal of the amplifier 350 is coupled to a sensing device for sensing the drain-source current IdsL of the low side transistor QL through a second input capacitor CS2 such that an AC component of the noise input signal Vnoise is coupled from the sensing device through the second input capacitor CS2. In one embodiment, the sensing device can be for example a current mirror for mirroring a portion of the drain-source current IdsL and a resistor Rs2 for converting the mirrored current to a sensed voltage related to the noise input signal Vnoise. In one embodiment, the sensing device can be for example a sensing resistor coupled in series with the low side transistor QL. A non-inverting input terminal of the amplifier 350 is coupled to a DC reference voltage Vref.

Still referring to FIG. 10, the noise cancelling signal I_inj is generated from an output terminal of the amplifier 350. The noise cancelling signal I_inj is coupled to the input node NII through an injection capacitor CINJ. More specifically, an AC component of the noise cancelling signal I_inj is injected into the input node NII of the switching power converter 110.

Figure 11:
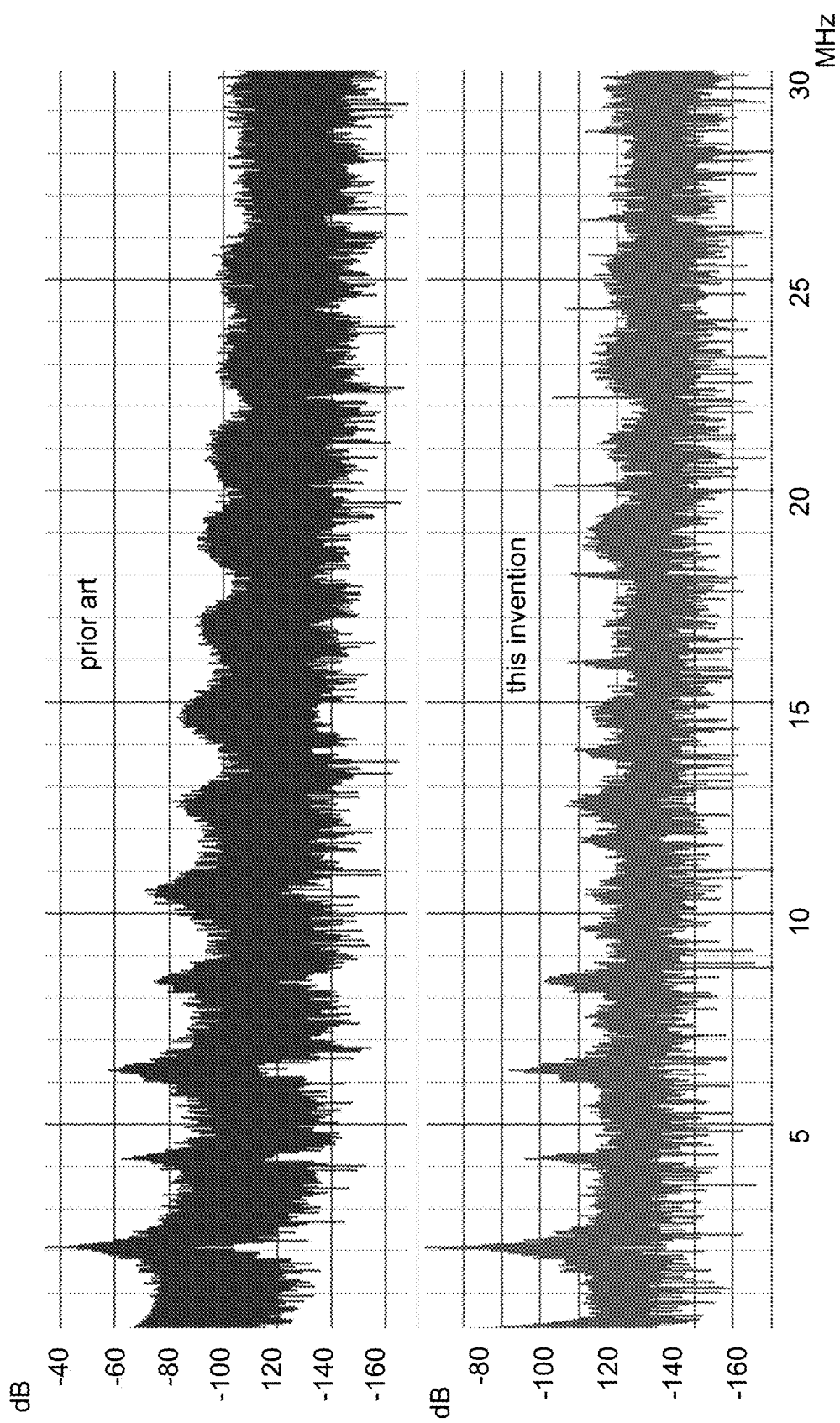
FIG. 11 shows frequency response diagrams of FFT measured by the analyzer coupled from the LISN.

FIG. 11 shows frequency response diagrams of FFT (Fast Fourier Transform) measured by the analyzer coupled from the LISN 50 of the prior art as shown in FIG. 1 and of the switching power converter 110. Note that from the baseband to all the higher harmonics show improvements in the switching power converter 110 which includes the AEF circuit for suppressing the switching noise.

Figure 12A:
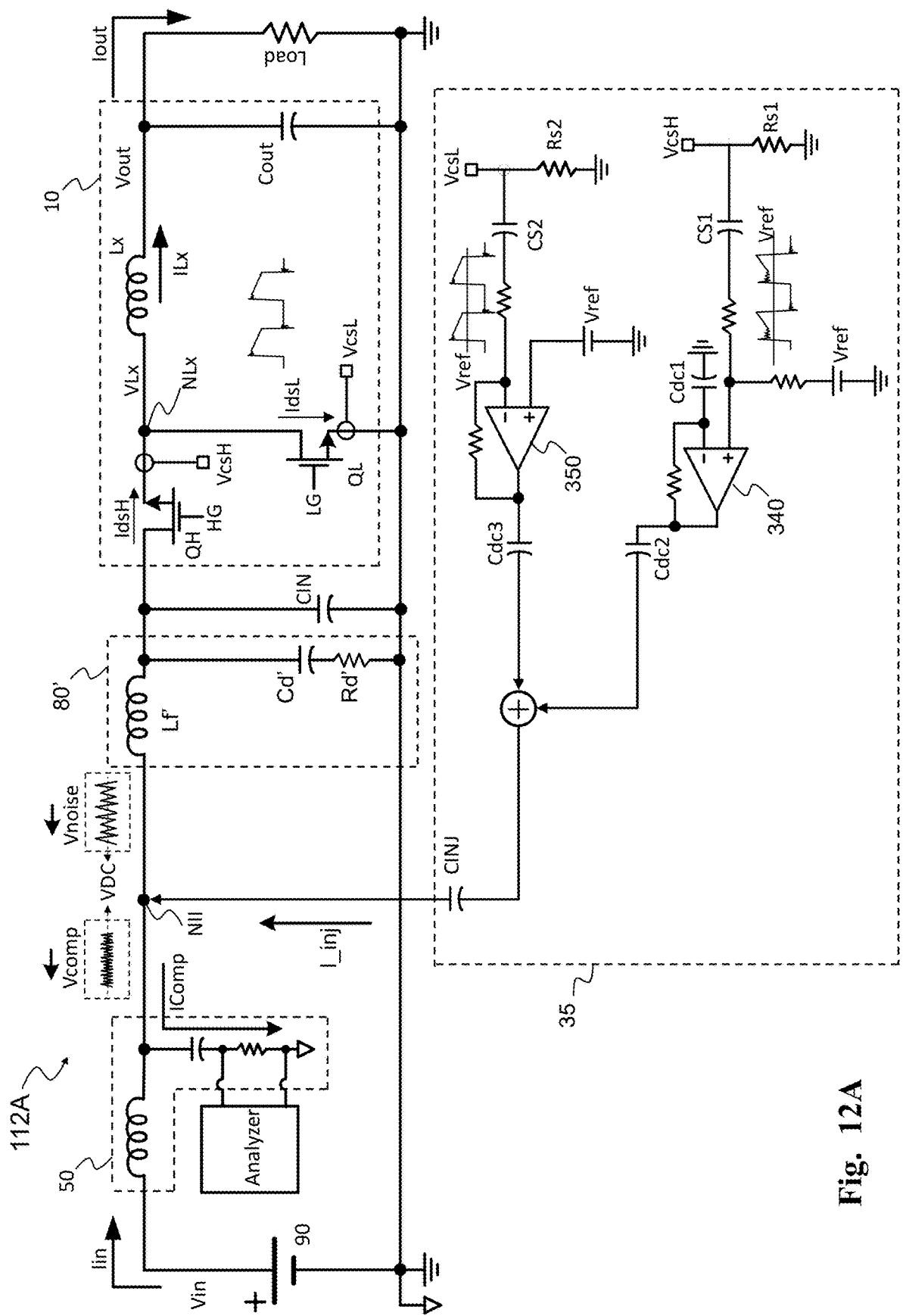
FIG. 12A shows a schematic diagram of a preferred embodiment of the switching power converter of the present invention.
Figure 12B:
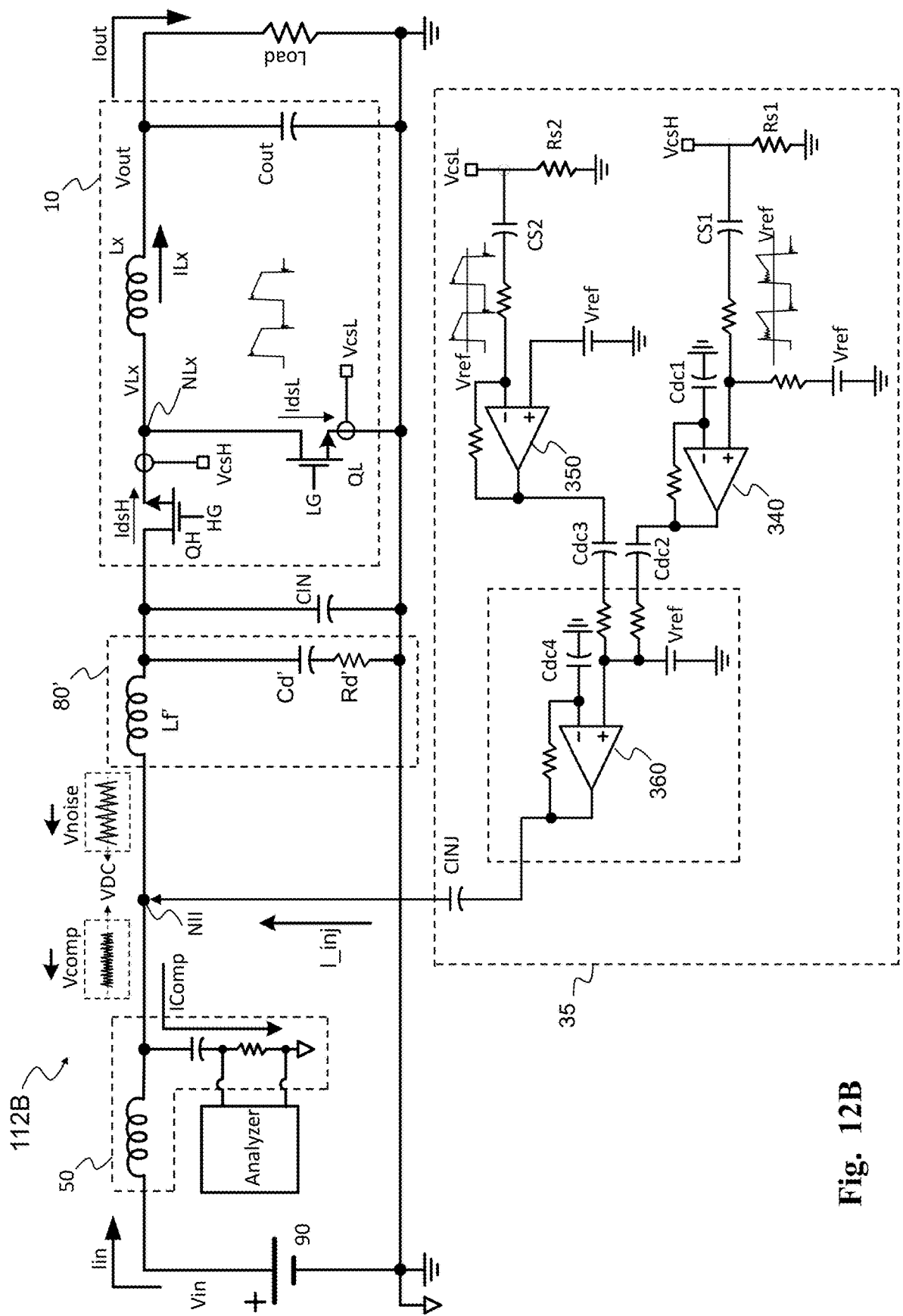
FIG. 12B shows a schematic diagram of a more specific embodiment of the switching power converter of the present invention.

FIG. 12A shows a schematic diagram of a preferred embodiment of the switching power converter of the present invention. The switching power converter 112A is a combination of the switching power converters 108 and 110. In one embodiment, as shown in FIG. 12A, the output signals of the amplifiers 340 and 350 are summed together and then injected into the input node NII of the switching power converter 112A through the injection capacitor CINJ.

FIG. 12B shows a schematic diagram of a more specific embodiment of corresponding to FIG. 12A.

Still referring to FIG. 12B, the AEF circuit 35 of the switching power converter 112B includes an amplifier 360 which is configured as a non-inverting adder circuit. A non-inverting input terminal of the amplifier 360 is coupled to the output terminal of the amplifier 340 through the DC blocking capacitor Cdc2 and is coupled to the output terminal of the amplifier 350 through the DC blocking capacitor Cdc3 such that an AC component of an output signal generated from the output terminal of the amplifier 340 and an AC component of an output signal generated from the output terminal of the amplifier 350 are superposed and amplified through the amplifier 360. An inverting input terminal of the amplifier 360 is coupled to a ground node through a DC blocking capacitor Cdc4.

Still referring to FIG. 12B, the noise cancelling signal I_inj is generated from an output terminal of the amplifier 360. The noise cancelling signal I_inj is coupled to the input node NII through an injection capacitor CINJ. More specifically, an AC component of the noise cancelling signal I_inj is injected into the input node NII of the switching power converter 112B.

Figure 13:
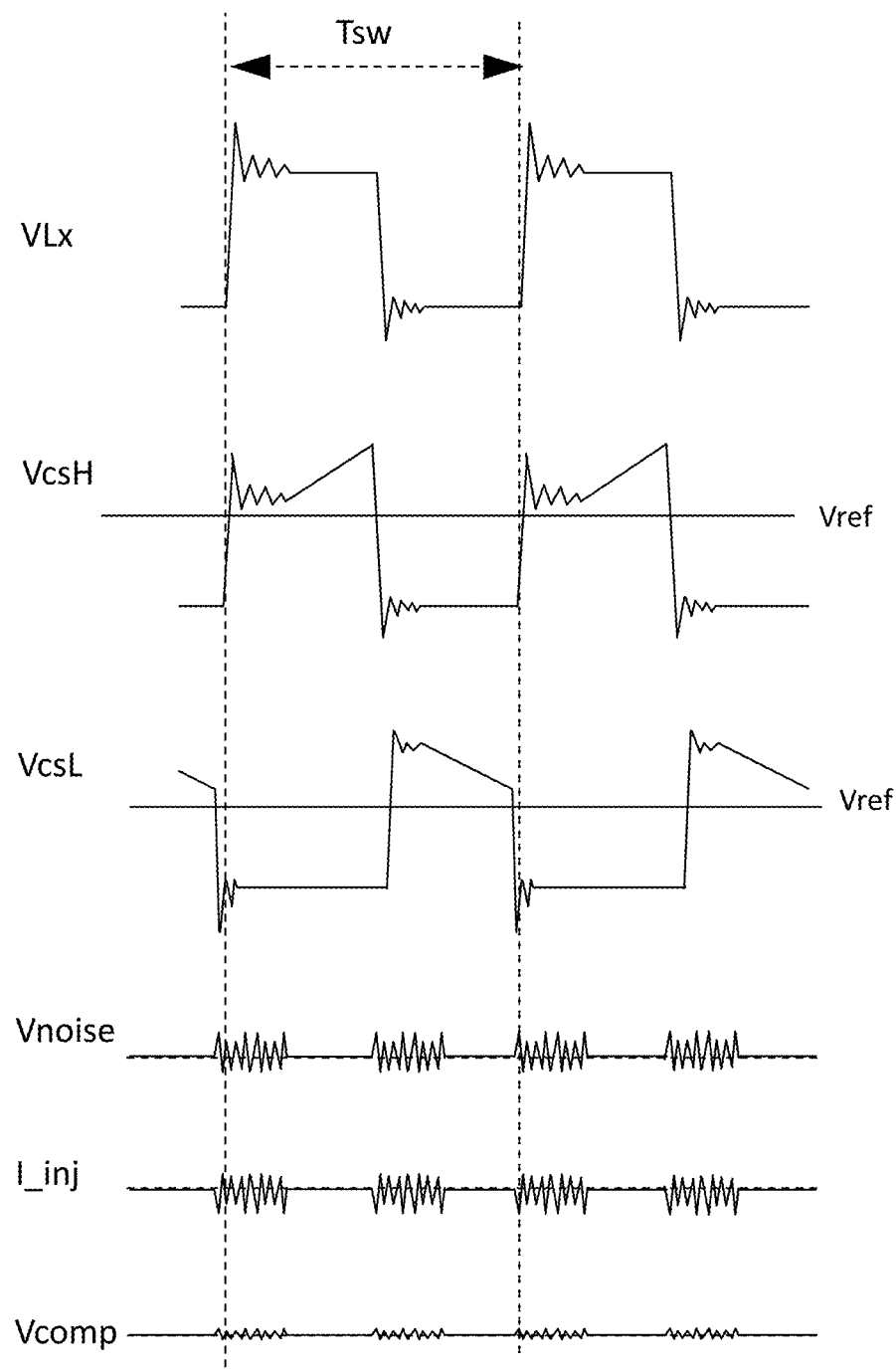
FIG. 13 shows operation waveforms corresponding to the embodiment shown in FIG. 8, FIG. 10 and FIG. 12B.

FIG. 13 shows operation waveforms corresponding to the embodiment shown in FIG. 8, FIG. 10 and FIG. 12B. The first panel shows the switching node voltage VLx on the switching node NLX. The second panel shows the sensed signal VcsH which is related to the inductor current ILx and is sensed according to the drain-source current IdsH of the high side transistor QH. The third panel shows the sensed signal VcsL which is related to the inductor current ILx and is sensed according to the drain-source current IdsL of the low side transistor QL. The fourth panel shows the noise input signal Vnoise. The fifth panel shows the noise cancelling signal I_inj which is obtained by superposing and amplifying the sensed signal VcsH and the sensed signal VcsL, wherein the DC component is blocked by the injection capacitor (e.g. CINJ). The sixth panel shows the compensated signal Vcomp which is a cancellation result of the noise input signal Vnoise canceled by the noise cancelling signal I_inj. The level of the compensated signal Vcomp is much lower compared to the noise input signal Vnoise. Note that the switching frequency of the switching converter according to the present invention is Fsw. Tsw is the cycle period corresponding to the switching frequency Fsw, wherein Fsw=1/Tsw.

Figure 14:
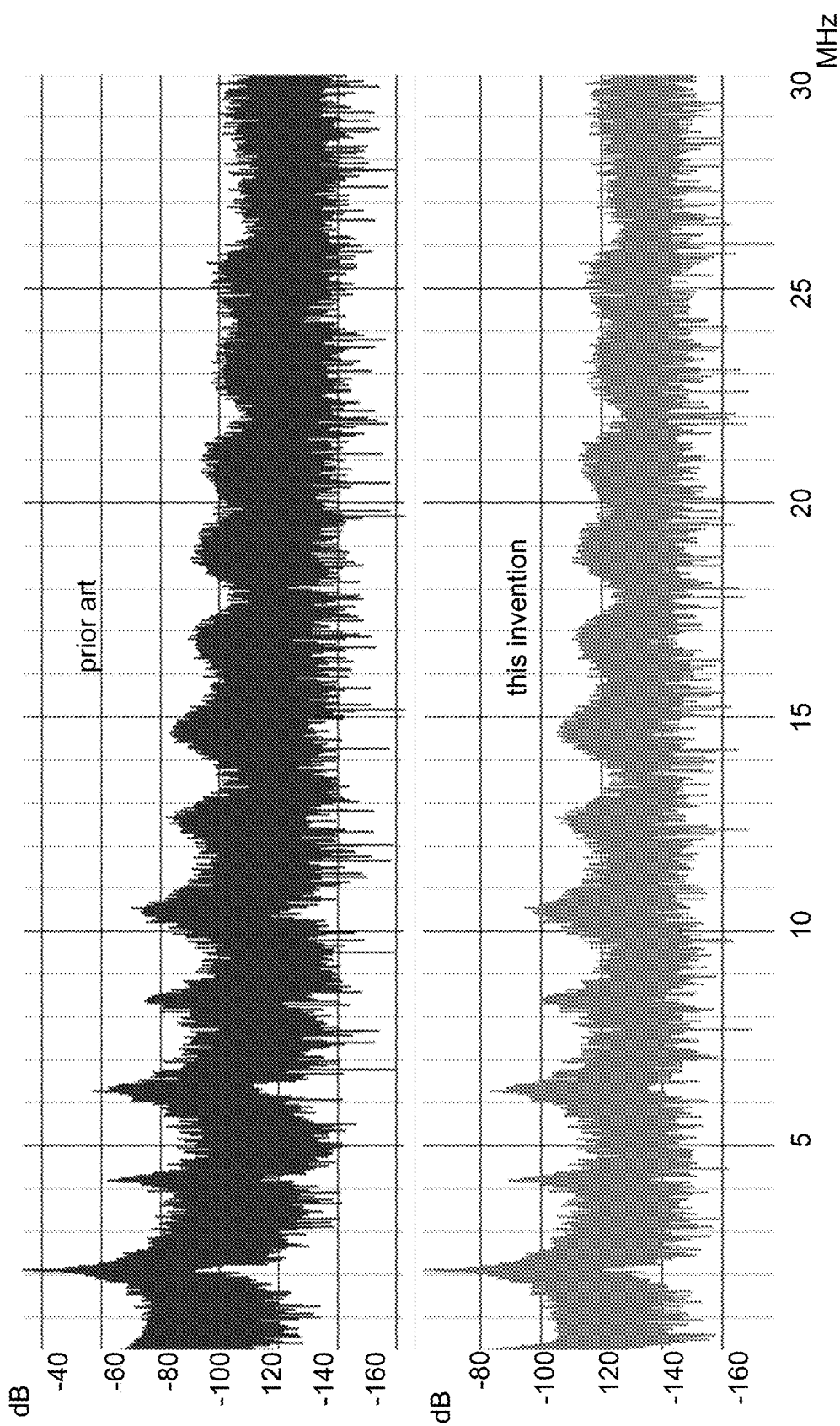
FIG. 14 shows frequency response diagrams of FFT measured by the analyzer coupled from the LISN.

FIG. 14 shows frequency response diagrams of FFT (Fast Fourier Transform) measured by the analyzer coupled from the LISN 50 of the prior art as shown in FIG. 1 and of the switching power converter 112B. Note that from the baseband to all the higher harmonics e switching power converter 112B which includes the AEF circuit for suppressing the switching noise.

FIG. 15 shows a comparison table of the noise level of the prior art (noted as w/o AEF) and of all the aforementioned embodiments of the switching power converters having various AEF circuits according to the present invention. As shown in FIG. 15, great improvements are achieved by all the embodiments according to the present invention compared over the prior art.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching power converter comprising:
  a power stage circuit, including at least one transistor, configured to operably switch an inductor to convert an input power to an output power, the input power including an input current;
  a switching controller, configured to operably control the at least one transistor;
  a noise sensing circuit, configured to sense, by sensing an input related signal, a switching noise caused by the switching of the power stage circuit to generate a noise input signal, wherein the input related signal is related to the input current;
  an AEF (Active EMI Filter) circuit, configured to amplify the noise input signal to generate an amplified noise signal;
  an injection capacitor, having one end coupled to receive the amplified noise signal and another end to generate a noise cancelling signal, wherein the noise cancelling signal is injected into an input node of the switching power converter, so as to suppress the switching noise and thus reducing EMI, wherein the input power is provided through the input node to the power stage circuit; and a passive filter circuit, wherein the passive filter circuit is coupled between the input node and the power stage circuit, wherein the passive filter circuit includes a filtering inductor and a filtering capacitor for further filtering the switching noise;

wherein the noise sensing circuit includes:
a sensing resistor, having a first end coupled to the input node and a second end coupled to the power stage circuit, wherein the input related signal corresponds to a voltage across the sensing resistor;
a first coupling branch, which includes a first resistor and a first input capacitor coupled in parallel between a first terminal and a second terminal of the first coupling branch, wherein the first terminal of the first coupling branch is directly connected to the first end of the sensing resistor; and
a second coupling branch, which includes a second resistor and a second input capacitor coupled in parallel between a first terminal and a second terminal of the second coupling branch, wherein a first terminal of the second coupling branch is directly connected to the second end of the sensing resistor;
wherein the noise input signal corresponds to a voltage difference between the second terminal of the first coupling branch and the second terminal of the second coupling branch;

wherein the AEF circuit includes:
a first amplifier, configured to differentially amplify the noise input signal, wherein the amplified noise signal is generated according to a voltage at an output terminal of the first amplifier; and
a second amplifier, wherein the first amplifier amplifies the noise input signal to generate an intermediate signal, wherein the second amplifier receives an AC component of the intermediate signal through a first DC blocking capacitor connected between the first amplifier and the second amplifier and amplifies the AC component of the intermediate signal to generate the amplified noise signal;
wherein an AC coupling ratio is higher than a DC coupling ratio of coupling the input related signal for generating the noise input signal through the first and second coupling branches.

2. A switching power converter comprising:
a power stage circuit, including at least one transistor, configured to operably switch an inductor to convert an input power to an output power, the input power including an input current;
a switching controller, configured to operably control the at least one transistor;
a noise sensing circuit, configured to sense, by sensing an input related signal, a switching noise caused by the switching of the power stage circuit to generate a noise input signal, wherein the input related signal is related to the input current;

an AEF (Active EMI Filter) circuit, configured to amplify the noise input signal to generate an amplified noise signal;

an injection capacitor, having one end coupled to receive the amplified noise signal and another end to generate a noise cancelling signal, wherein the noise cancelling signal is injected into an input node of the switching power converter, so as to suppress the switching noise and thus reducing EMI, wherein the input power is provided through the input node to the power stage circuit; and a passive filter circuit, wherein the passive filter circuit is coupled between the input node and the power stage circuit, wherein the passive filter circuit includes a filtering inductor and a filtering capacitor for further filtering the switching noise;

wherein the at least one transistor includes a high side transistor and a low side transistor which are coupled to a switching node for switching one end of the inductor;

wherein the input related signal includes a first input related signal and a second input related signal, and the noise input signal includes a first noise input signal and a second noise input signal;

wherein the noise sensing circuit includes:
a first conversion resistor coupled to sense a current flowing through the high side transistor for generating the first input related signal;
a first input capacitor, having one end coupled to receive the first input related signal and another end for generating the first noise input signal at the another end of the first input capacitor;
a second conversion resistor coupled to sense a current flowing through the low side transistor for generating the second input related signal; and
a second input capacitor, having one end coupled to receive the second input related signal and another end for generating the second noise input signal at the another end of the second input capacitor;

wherein the AEF circuit includes:
a first amplifier, configured as a non-inverting amplifier for amplifying the first noise input signal to generate a first noise output signal;
a second amplifier, configured as an inverting amplifier for amplifying the second noise input signal to generate a second noise output signal; and
a third amplifier, configured as a non-inverting adder circuit, wherein a non-inverting input terminal of the third amplifier is coupled to an output terminal of the first amplifier through a first DC blocking capacitor and is also coupled to an output terminal of the second amplifier through a second DC blocking capacitor, such that an AC component of the first noise output signal and an AC component of the second noise output signal are superposed through the third amplifier to generate the amplified noise signal.

* * * * *